US012749801B2

(12) United States Patent
Zhu et al.

(10) Patent No.: US 12,749,801 B2

(45) Date of Patent: Sep. 29, 2026

(54) ANTENNA STRUCTURE WITH METAL PORTION COUPLED TO RADIATION AND GROUNDING PORTIONS AND ELECTRONIC DEVICE HAVING THE SAME

(71) Applicant: Wistron NeWeb Corporation, Hsinchu (TW)

(72) Inventors: Jia-Le Zhu, Hsinchu (TW); Ching-Wen Chen, Hsinchu (TW); Cheng-Wei Chiang, Hsinchu (TW); Wen-Pin Ho, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 29 days.

(21) Appl. No.: 18/888,198

(22) Filed: Sep. 18, 2024

(65) Prior Publication Data

US 2025/0105512 A1 Mar. 27, 2025

(30) Foreign Application Priority Data

Sep. 22, 2023 (TW) ................................ 112136237

(51) Int. Cl.

| | |
|---|---|
| ***H01Q 1/24*** | (2006.01) |
| ***H01Q 1/22*** | (2006.01) |
| ***H01Q 1/44*** | (2006.01) |
| ***H01Q 5/328*** | (2015.01) |
| ***H01Q 5/371*** | (2015.01) |
| ***H01Q 5/378*** | (2015.01) |
| ***H01Q 9/42*** | (2006.01) |

(52) U.S. Cl.

CPC ........... *H01Q 1/243* (2013.01); *H01Q 1/2266* (2013.01); *H01Q 1/44* (2013.01); *H01Q 5/328* (2015.01); *H01Q 5/371* (2015.01); *H01Q 5/378* (2015.01); *H01Q 9/42* (2013.01)

(58) Field of Classification Search

CPC .... H01Q 1/2258; H01Q 1/2266; H01Q 1/243; H01Q 1/245; H01Q 1/44; H01Q 5/328; H01Q 5/342; H01Q 5/357; H01Q 5/364; H01Q 5/371; H01Q 5/378; H01Q 5/385; H01Q 5/392; H01Q 5/50; H01Q 9/42

See application file for complete search history.

(56) References Cited

U.S. PATENT DOCUMENTS 7,956,812 B2 6/2011 Chen et al.
2010/0039329 A1* 2/2010 Chen ........................ H01Q 1/38
343/700 MS (Continued)

FOREIGN PATENT DOCUMENTS

TW 201008025 A 2/2010

*Primary Examiner* — Robert Karacsony

(74) *Attorney, Agent, or Firm* — McClure, Qualey & Rodack, LLP

(57) ABSTRACT

An antenna structure and an electronic device are provided. The antenna structure includes a feeding source, a main radiation portion, a metal portion, and a grounding portion. The main radiation portion is signally connected to the feeding source. There is a first gap between the metal portion and the main radiation portion. There is a second gap between the grounding portion and the metal portion, and there is a third gap between the grounding portion and the main radiation portion. The main radiation portion couples with the metal portion via the first gap, and the grounding portion couples with the metal portion via the second gap.

15 Claims, 7 Drawing Sheets

(56) References Cited

U.S. PATENT DOCUMENTS

| | | | | |
|---|---|---|---|---|
| 2017/0155186 | A1* | 6/2017 | Lin | H01Q 5/392 |
| 2020/0076060 | A1* | 3/2020 | Lin | H01Q 5/35 |
| 2023/0352839 | A1* | 11/2023 | Hou | H01Q 1/48 |

* cited by examiner

ANTENNA STRUCTURE WITH METAL PORTION COUPLED TO RADIATION AND GROUNDING PORTIONS AND ELECTRONIC DEVICE HAVING THE SAME

CROSS-REFERENCE TO RELATED PATENT APPLICATION

This application claims the benefit of priority to Taiwan Patent Application No. 112136237, filed on Sep. 22, 2023. The entire content of the above identified application is incorporated herein by reference.

BACKGROUND

Technical Field

The present disclosure relates to an antenna structure and an electronic device, and more particularly, to an antenna structure arranged around a speaker and an electronic device having such antenna structure.

Description of Related Art

There is an increasing demand for functionality and performance in electronic devices, and for electronic devices having limited volume size, the position and size of antennas in electronic devices are compressed. At the same time, the bandwidth that the antenna needs to cover is getting broader, and so the space utilization of antennas in electronic devices becomes critical.

In view of this, how to develop an antenna structure that can effectively utilize the remaining space in the electronic device and extend the bandwidth has become a goal in the related industries.

SUMMARY

It is an aspect of the present disclosure to provide an antenna structure that includes a feeding source, a main radiation portion, a metal portion, and a grounding portion. The main radiation portion is signally connected to the feeding source. The metal portion is spaced apart from the main radiation portion by a first gap. The grounding portion is spaced apart from the metal portion by a second gap. The grounding portion is spaced apart from the main radiation portion by a third gap. The main radiation portion couples with the metal portion via the first gap, and the grounding portion couples with the metal portion via the second gap.

It is another aspect of the present disclosure to provide an electronic device that includes a metal portion and an antenna unit. The antenna unit includes a feeding source, a main radiation portion, and a grounding portion. The main radiation portion is signally connected to the feeding source and is spaced apart from the metal portion by a first gap. The grounding portion is spaced apart from the metal portion by a second gap and is connected to a grounding layer. The main radiation portion couples with the metal portion via the first gap, and the grounding portion is couples with the metal portion via the second gap.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
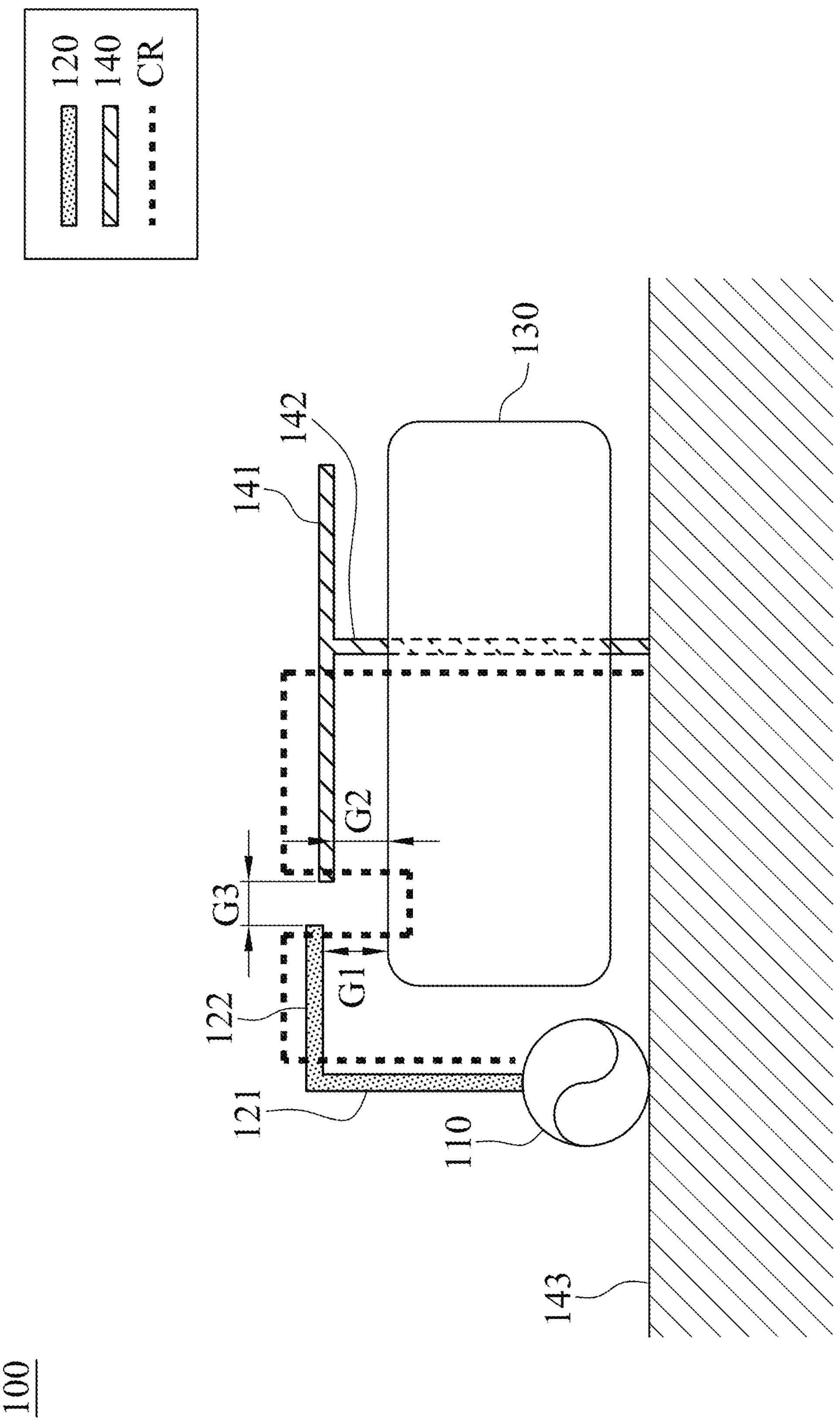
FIG. 1 is a schematic diagram of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the present disclosure, when an element (i.e. a unit or a module) is described to "connect" to another element, it means to that the element is directly connected to the other element, or that certain element is indirectly connected to the other element, which implies that there is another element between the element and the other element. When an element is described to "directly connect" to another element, it means to no other element is between the element and the other element.

FIG. 1 is a schematic diagram of an antenna structure 100 according to a first embodiment of the present disclosure. Referring to FIG. 1, the antenna structure 100 includes a feeding source 110, a main radiation portion 120, a metal portion 130, and a grounding portion 140. The main radiation portion 120 is signally connected to the feeding source 110. There is a first gap G1 between the metal portion 130 and the main radiation portion 120. There is a second gap G2 between the grounding portion 140 and the metal portion 130, and there is a third gap G3 between the grounding portion 140 and the main radiation portion 120. The main radiation portion 120 is coupled to the metal portion 130 via the first gap G1, and the grounding portion 140 is coupled to the metal portion 130 via the second gap G2.

Specifically, the main radiation portion 120 can include a first segment 121 and a second segment 122. The first segment 121 is connected to the feeding source 110. The second segment 122 is perpendicularly connected to the first segment 121 and extends in a direction toward the metal portion 130. There is a first gap G1 between the second segment 122 and the metal portion 130. The grounding portion 140 includes a third segment 141, a fourth segment 142, and a grounding layer 143. The third segment 141 is parallel to the second segment 122, and there is a third gap G3 between the second segment 122 and the third segment 141. The fourth segment 142 is perpendicularly connected to the third segment 141 and overlaps with the metal portion 130. The fourth segment 142 is connected to the grounding layer 143. In other words, the main radiation portion 120 can be in an inverted L shape; the grounding portion 140 can be in a T shape, but the present disclosure is not limited thereto. The first gap G1 can be greater than or equal to 2 millimeters and less than or equal to 6 millimeters, and the second gap G2 can be greater than or equal to 0.5 millimeters and less than or equal to 3 millimeters, but the present disclosure is not limited thereto. In FIG. 1, part of the fourth segment 142 overlaps with the metal portion 130, so part of the fourth segment 142 is shown in dashed lines.

When a signal is fed from the feeding source 110, its path can be as shown in the coupling path CR in FIG. 1, passing through the feeding source 110, the first segment 121, the second segment 122, the first gap G1, the metal portion 130, the second gap G2, the third segment 141, and the fourth segment 142 to the grounding layer 143. In the first embodiment, the resonant frequency band of the main radiation portion 120 is between 2.4 GHz and 2.69 GHz. Thus, the antenna structure 100 of the present disclosure can expand the low-frequency bandwidth of the antenna structure 100 through the coupling of the main radiation portion 120 with the metal portion 130 and the coupling of the grounding portion 140 with the metal portion 130, thereby extending the low-frequency bandwidth to 1.4 GHz.

Figure 2:
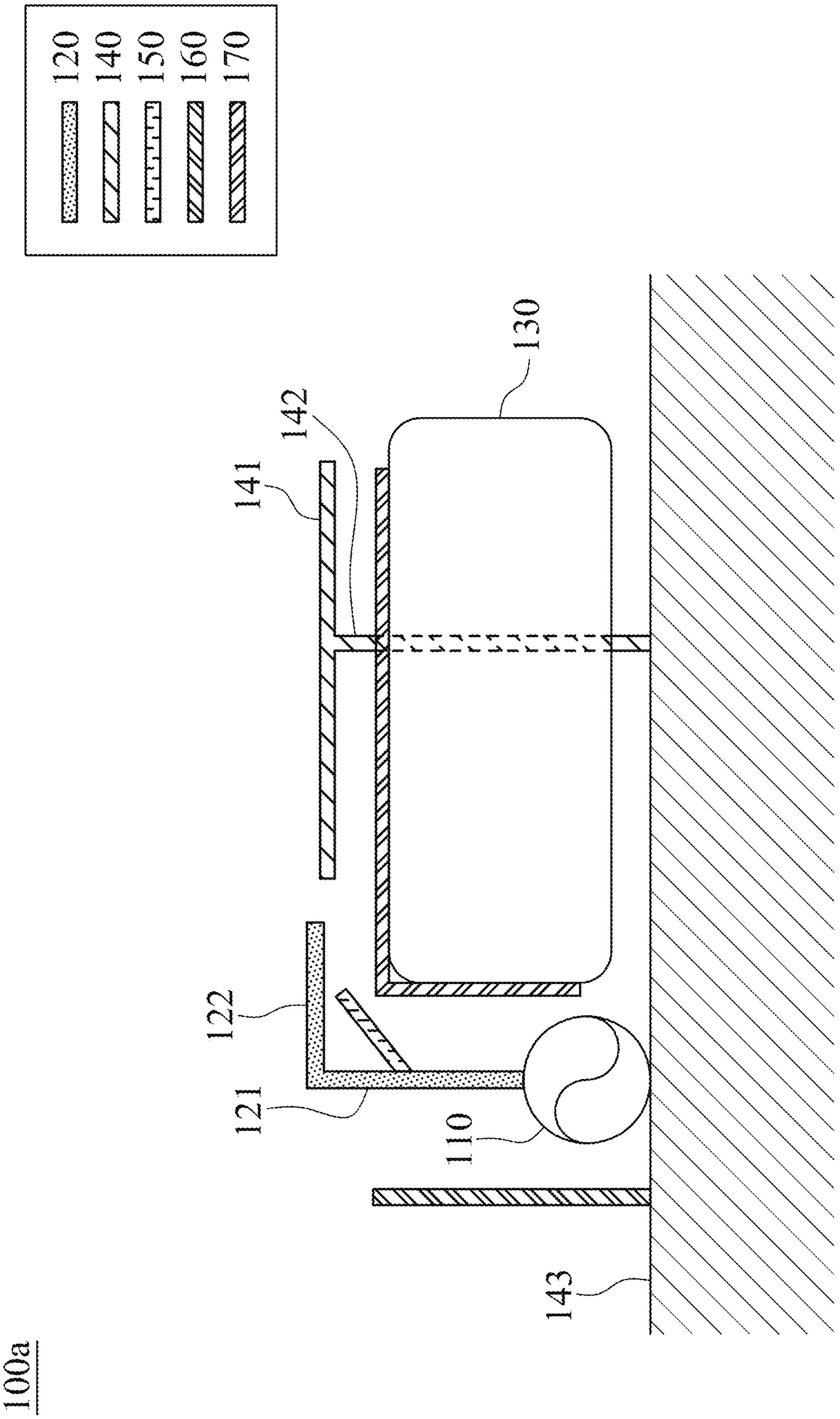
FIG. 2 is a schematic diagram of an antenna structure according to a second embodiment of the present disclosure.

FIG. 2 is a schematic diagram of an antenna structure **100*a* according to a second embodiment of the present disclosure. The antenna structure 100*a* includes a feeding source 110, a main radiation portion 120, a metal portion 130, and a grounding portion 140. In the second embodiment, the feeding source 110, the main radiation portion 120, the metal portion 130, and the grounding portion 140 are the same as those in the first embodiment, and will not be described herein. In specific, the antenna structure 100*a* can further include a high-frequency radiation portion 150, a branch radiation portion 160, and a floating portion 170**.

Specifically, one end of the high-frequency radiation portion 150 is connected to the first segment 121, and the other end extends in a direction toward the second segment 122. The resonant frequency of the high-frequency radiation portion 150 is between 4 GHz and 5 GHz. The branch radiation portion 160 is located away from the metal portion 130 and is parallel to the first segment 121. The feeding source 110 and the first segment 121 are located between the branch radiation portion 160 and the metal portion 130. The resonant frequency of the branch radiation portion 160 is 3 GHZ. The floating portion 170 is connected to the metal portion 130 and is arranged between the main radiation portion 120 and the metal portion 130, and between the third segment 141 of the grounding portion 140 and the metal portion 130.

Figure 3:
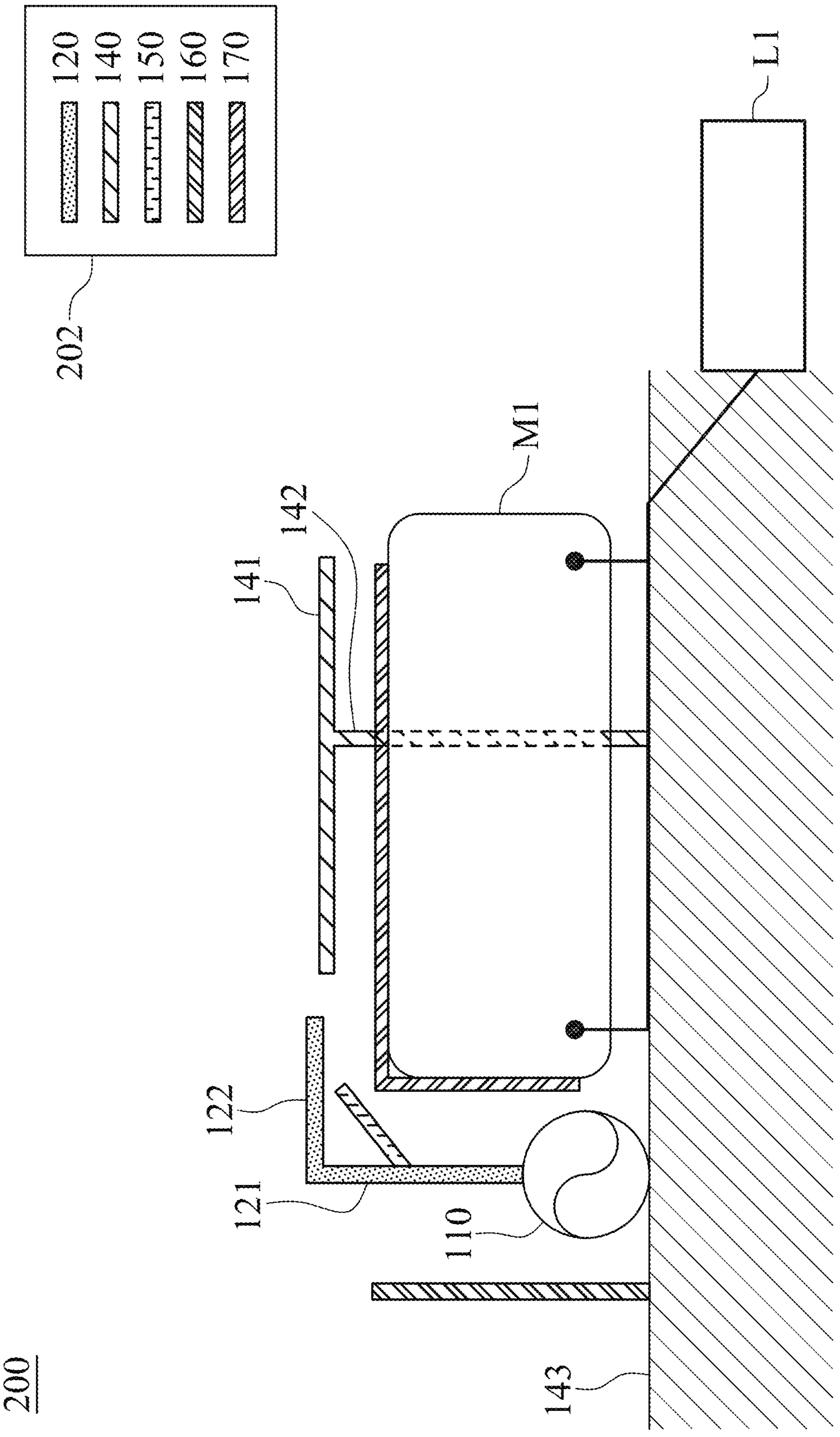
FIG. 3 is a schematic diagram of an electronic device according to a third embodiment of the present disclosure.

FIG. 3 is a schematic diagram of an electronic device 200 according to a third embodiment of the present disclosure. Referring to FIG. 1 to FIG. 3, the electronic device 200 includes a metal portion M1 and an antenna unit 202. The antenna unit 202 includes a feeding source 110, a main radiation portion 120, a grounding portion 140, a high-frequency radiation portion 150, a branch radiation portion 160, and a floating portion 170. The main radiation portion 120 is signally connected to the feeding source 110 and is spaced a first gap G1 apart from the metal portion M1. The grounding portion 140 is spaced a second gap G2 apart from the metal portion M1 and is connected to a grounding layer 143. The main radiation portion 120 is coupled to the metal portion M1 via the first gap G1, and the grounding portion 140 is coupled to the metal portion M1 via the second gap G2. In the third embodiment, the feeding source 110, the main radiation portion 120, the grounding portion 140, the high-frequency radiation portion 150, the branch radiation portion 160, and the floating portion 170 can respectively have the same structure as the feeding source 110, the main radiation portion 120, the grounding portion 140, the high-frequency radiation portion 150, the branch radiation portion 160, and the floating portion 170 in the second embodiment, and will not be described herein. In specific, the metal portion Ml can be part of a speaker/transducer component or assembly, a metal frame, a magnet, or an input/output port in the electronic device 200, or other metal structures. In other words, the metal portion Ml can be arranged in the speaker component (transducer assembly), metal frame, magnet, or input/output port in the electronic device 200, but the present disclosure is not limited thereto. In addition, the electronic device 200 further includes an audio source line L1, which is connected to the metal portion M1 and used to transmit audio source signals.

Specifically, the electronic device 200 can be a notebook computer, a personal digital assistant, or other electronic devices, but the present disclosure is not limited thereto. In the third embodiment, the metal portion M1 can be arranged in the transducer assembly, and can also be a part of the transducer assembly in the electronic device 200. In addition, the floating portion 170 can be made of metal material and can be used to block the audio source signal of the audio source line L1 from interfering with the antenna unit 202. Thus, the electronic device 200 of the present disclosure places the antenna unit 202 around the metal portion M1, effectively utilizing the space in the electronic device 200 while extending the bandwidth of the antenna unit 202.

Figure 4:
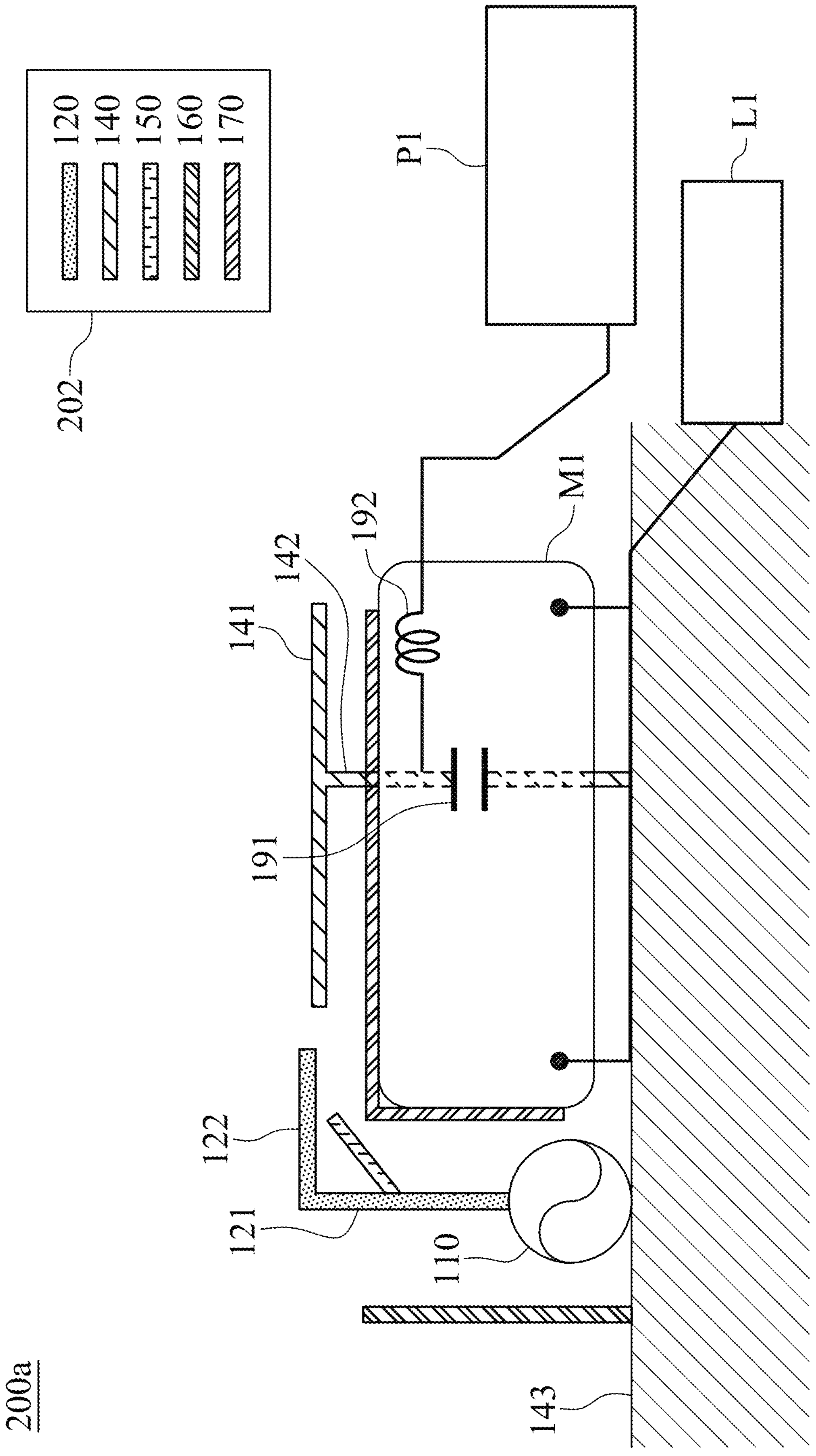
FIG. 4 is a schematic diagram of an electronic device according to a fourth embodiment of the present disclosure.

FIG. 4 is a schematic diagram of an electronic device **200*a* according to a fourth embodiment of the present disclosure. Referring to FIG. 3 and FIG. 4, the electronic device 200*a* includes a metal portion M1, an antenna unit 202, and an audio source line L1. The antenna unit 202 includes a feeding source 110, a main radiation portion 120, and a grounding portion 140. In the fourth embodiment, the metal portion M1, the antenna unit 202, and the audio source line L1 are the same as those in the third embodiment, and will not be described herein. In specific, the electronic device 200*a* can further include a sensing unit P1, a filter component 191, and an inductor component 192. The sensing unit P1 can be a proximity sensor in the electronic device 200*a*. When the sensing unit P1 is arranged close to the antenna unit 202, the sensing unit P1 may interfere with the antenna unit 202. Therefore, the electronic device 200*a* adds the filter component 191 in the fourth segment 142 of the antenna unit 202, and connects the sensing unit P1 to the fourth segment 142 via the inductor component 192. Thus, the electronic device 200***a* of the present disclosure can avoid the interference caused by the noise signal generated by the sensing unit P1 to the antenna unit 202 through the filter circuit formed by the filter component 191 and the inductor component 192.

Figure 5:
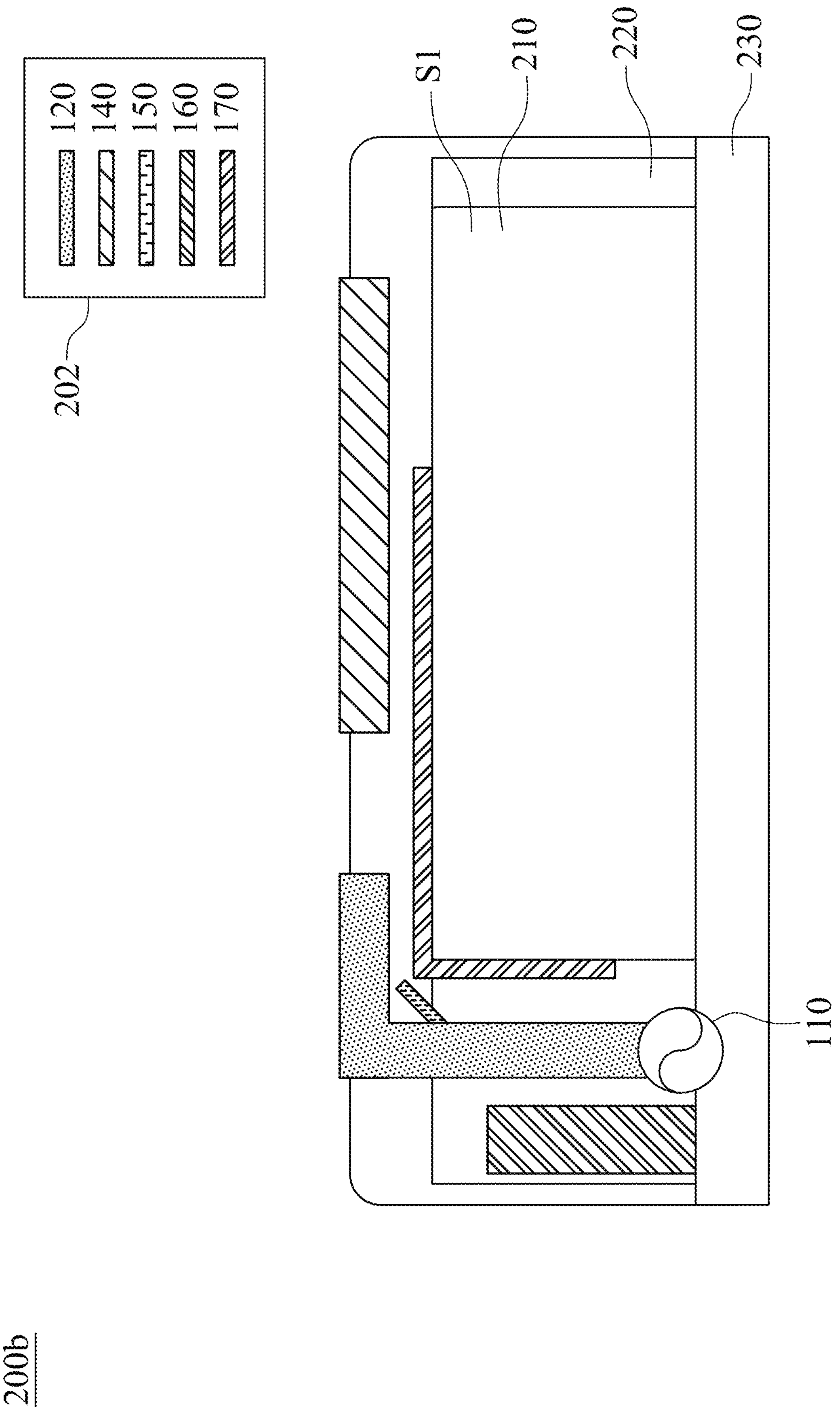
FIG. 5 is a schematic diagram of an electronic device according to a fifth embodiment of the present disclosure.
Figure 6:
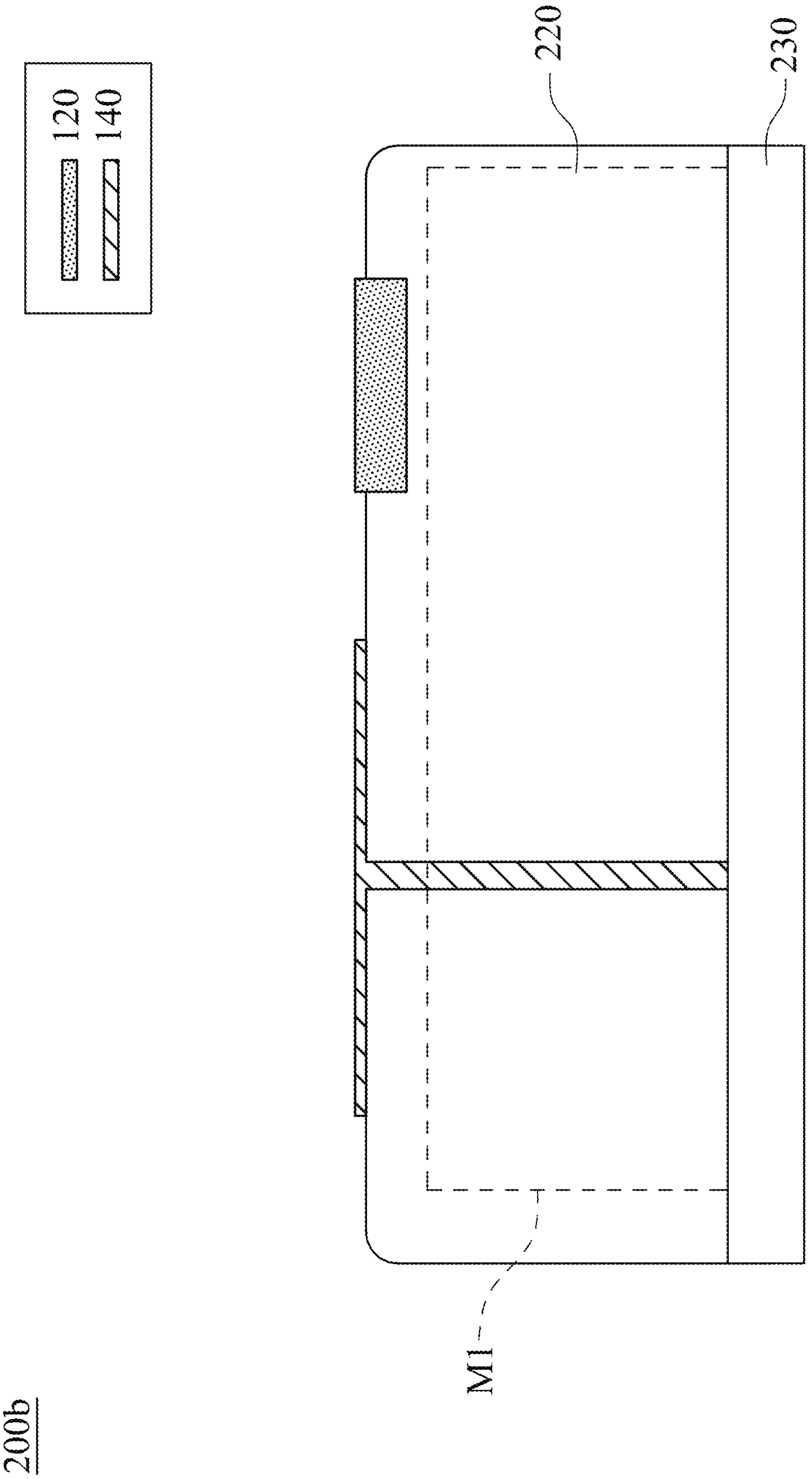
FIG. 6 is another schematic diagram of the electronic device shown in FIG. 5.
Figure 7:
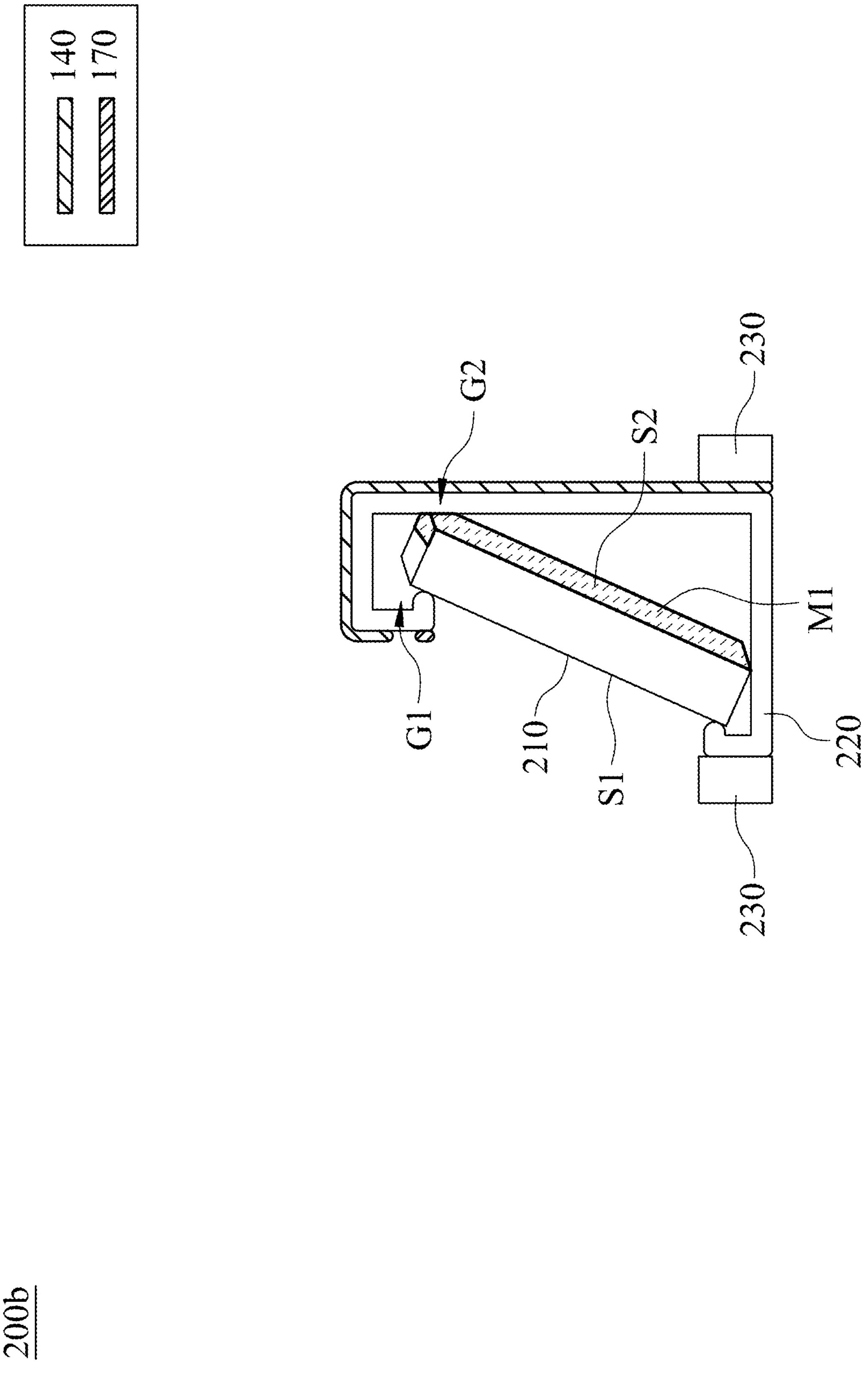
FIG. 7 is a side view of the electronic device shown in FIG. 5.

FIG. 5 is a schematic diagram of an electronic device 200*b* according to a fifth embodiment of the present disclosure. FIG. 6 is another schematic diagram of the electronic device 200*b* shown in FIG. 5. FIG. 7 is a side view of the electronic device 200*b* shown in FIG. 5. Referring to FIG. 5 to FIG. 7, the electronic device 200*b* includes a metal portion M1 and an antenna unit 202. The antenna unit 202 includes a feeding source 110, a main radiation portion 120, a grounding portion 140, a high-frequency radiation portion 150, a branch radiation portion 160, and a floating portion 170. In the fifth embodiment, the antenna unit 202 of the electronic device 200*b* can include the same structure as the antenna unit 202 of the electronic device 200 in the third embodiment or the antenna unit 202 of the electronic device 200*a* in the fourth embodiment, and will not be described herein. In specific, the metal portion M1 can be arranged in the speaker component. The speaker component includes a support/holder 220 and a speaker/transducer 210. The support 220 is fixed through a washer/pad 230. The speaker 210 is supported by the support 220 and includes a first surface/side S1 and a second surface/side S2. The metal portion M1 is placed on the second surface S2, and the main radiation portion 120 is close to the first surface S1 of the speaker 210.

In view of the above, the present disclosure has the following advantages. First, the antenna structure of the present disclosure can expand the low-frequency bandwidth of the antenna structure through secondary coupling of the metal portion respectively with the main radiation portion and the grounding portion, extending the low-frequency band to 1.4 GHz. Second, the electronic device of the present disclosure places the antenna unit around the metal portion, effectively utilizing the space in the electronic device while extending the bandwidth of the antenna unit. Third, the electronic device of the present disclosure can avoid the interference caused by the noise signal generated by the sensing unit to the antenna unit through the filter circuit formed by the filter component and the inductor component.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure comprising:

a feeding source;

a main radiation portion signally connected to the feeding source;

a metal portion spaced apart from the main radiation portion by a first gap; and a grounding portion spaced apart from the metal portion by a second gap and spaced apart from the main radiation portion by a third gap;

wherein the main radiation portion couples with the metal portion via the first gap, and the grounding portion couples with the metal portion via the second gap;

wherein the antenna structure further comprises:

a floating portion connected to the metal portion and disposed between the main radiation portion and the metal portion and disposed between a third segment of the grounding portion and the metal portion.

2. The antenna structure according to claim 1, wherein the main radiation portion comprises:

a first segment connected to the feeding source; and a second segment perpendicularly connected to the first segment and extending toward the metal portion;

wherein the second segment and the metal portion are spaced apart by the first gap.

3. The antenna structure according to claim 2, wherein the grounding portion comprises:

the third segment parallel to the second segment and spaced apart from the second segment by the third gap; and a fourth segment perpendicularly connected to the third segment and overlapping the metal portion;

wherein the third segment and the metal portion are spaced apart by the second gap.

4. The antenna structure according to claim 2, further comprising:

a high-frequency radiation portion connected to the first segment and extending toward the second segment, wherein a resonant frequency of the high-frequency radiation portion is between 4 GHz and 5 GHz.

5. The antenna structure according to claim 2, further comprising:

a branch radiation portion away from the metal portion and parallel to the first segment, wherein a resonant frequency of the branch radiation portion is 3 GHz.

6. The antenna structure according to claim 1, wherein the first gap is greater than or equal to 2 mm and less than or equal to 6 mm, and the second gap is greater than or equal to 0.5 mm and less than or equal to 3 mm.

7. An electronic device comprising:

a metal portion; and an antenna unit comprising:

a feeding source;

a main radiation portion signally connected to the feeding source and spaced apart from the metal portion by a first gap; and a grounding portion spaced apart from the metal portion by a second gap and connected to a grounding layer;

wherein the main radiation portion couples with the metal portion via the first gap, and the grounding portion couples with the metal portion via the second gap;

wherein the metal portion is arranged in one of a transducer assembly, a metal frame, a magnet, and an input-output port.

8. The electronic device according to claim 7, wherein the metal portion is arranged in the transducer assembly, and the transducer assembly comprises:

a holder; and a transducer held by the holder and comprising a first side and a second side;

wherein the metal portion is disposed on the second side.

9. The electronic device according to claim 8, wherein the main radiation portion is disposed on the holder and comprises:

a first segment connected to the feeding source; and a second segment perpendicularly connected to the first segment and extending toward the metal portion;

wherein the second segment and the metal portion are spaced apart by the first gap, and the main radiation portion is close to the first side of the transducer.

10. The electronic device according to claim 9, wherein the grounding portion comprises:

a third segment parallel to the second segment; and a fourth segment perpendicularly connected to the third segment;

wherein the third segment and the metal portion are spaced apart by the second gap, and the second segment and the third segment are spaced apart by a third gap.

11. The electronic device according to claim 9, wherein the antenna unit further comprises:

a high-frequency radiation portion connected to the first segment and extending toward the second segment, wherein a resonant frequency of the high-frequency radiation portion is between 4 GHz and 5 GHz.

12. The electronic device according to claim 9, wherein the antenna unit further comprises:

a branch radiation portion away from the metal portion and parallel to the first segment, wherein a resonant frequency of the branch radiation portion is 3 GHz.

13. The electronic device according to claim 8, wherein the antenna unit further comprises:

a floating portion connected to the metal portion and disposed between the main radiation portion and the metal portion and disposed between the grounding portion and the metal portion;

wherein the floating portion is configured to isolate a signal source of the transducer assembly.

14. The electronic device according to claim 7, wherein the first gap is greater than or equal to 2 mm and less than or equal to 6 mm, and the second gap is greater than or equal to 0.5 mm and less than or equal to 3 mm.

15. The electronic device according to claim 10, further comprising:

a sensing unit connected to the fourth segment; and a filter component connected between the fourth segment and the grounding layer for isolating a signal of the sensing unit.

* * * * *